United States Patent
Saad

(10) Patent No.: US 11,053,341 B2
(45) Date of Patent: Jul. 6, 2021

(54) RIGID POLYURETHANE FOAM

(71) Applicant: BASF SE, Ludwigshafen am Rhein (DE)

(72) Inventor: Fernand Saad, Brownstown, MI (US)

(73) Assignee: BASF SE, Ludwigshafen am Rhein (DE)

(*) Notice: Subject to any disclaimer, the term of this patent is extended or adjusted under 35 U.S.C. 154(b) by 317 days.

(21) Appl. No.: 16/082,056

(22) PCT Filed: Mar. 6, 2017

(86) PCT No.: PCT/US2017/020896
§ 371 (c)(1),
(2) Date: Sep. 4, 2018

(87) PCT Pub. No.: WO2017/155863
PCT Pub. Date: Sep. 14, 2017

(65) Prior Publication Data
US 2020/0299453 A1    Sep. 24, 2020

Related U.S. Application Data

(60) Provisional application No. 62/304,794, filed on Mar. 7, 2016.

(51) Int. Cl.
| C08G 18/40 | (2006.01) |
|---|---|
| C08G 18/42 | (2006.01) |
| C08G 18/48 | (2006.01) |
| C08G 18/54 | (2006.01) |
| C08G 18/76 | (2006.01) |
| C08J 9/14 | (2006.01) |

(52) U.S. Cl.
CPC ....... *C08G 18/4825* (2013.01); *C08G 18/482* (2013.01); *C08G 18/4845* (2013.01); *C08J 9/144* (2013.01); *C08G 2110/0025* (2021.01); *C08J 2203/162* (2013.01)

(58) Field of Classification Search
CPC .......................... C08G 18/482; C08G 18/4845
See application file for complete search history.

(56) References Cited

U.S. PATENT DOCUMENTS

| 2007/0232712 A1* | 10/2007 | Emge ................. C08G 18/4883 |
| | | 521/176 |
| 2011/0303867 A1* | 12/2011 | Ling .................... C08G 18/71 |
| | | 252/62 |
| 2016/0369077 A1 | 12/2016 | Feng et al. |

FOREIGN PATENT DOCUMENTS

| CN | 103717656 A | 4/2014 |
| WO | 2015/131340 A1 | 9/2015 |

OTHER PUBLICATIONS

International Preliminary Report on Patentability from counterpart International Application No. PCT/US2017/020896 dated Sep. 20, 2018.
International Search Report and Written Opinion from counterpart International Patent Application No. PCT/US2017/020896, dated May 24, 2017.
First Office Action from counterpart Chinese Patent Appln. No. 201780023656.7 dated Jul. 20, 2020, and its English translation.
Second Office Action from counterpart Chinese Patent Appln. No. 201780023656.7 dated Feb. 9, 2021, and its English translation.

* cited by examiner

*Primary Examiner* — Melissa A Rioja
(74) *Attorney, Agent, or Firm* — DLA Piper LLP (US)

(57) ABSTRACT

A rigid polyurethane foam comprises the reaction product of an isocyanate and a thixotropic composition. The thixotropic composition comprises: a first polyether polyoi which is aromatic amine initiated and has ethylene and propylene oxide end capping; a second polyether polyoi having a viscosity at 25° C. of from about 500 to about 15,000 cps; a third polyether polyoi having a viscosity at 25° C. of from about 18,000 to about 60,000 cps and a functionality of from about 5 to about 7; and a hydrofluoroolefin. The thixotropic composition has a viscosity at 25° C. of from about 350 to about 5,000 cps. A method of forming a composite article comprising a substrate and the rigid polyurethane foam includes the steps of providing the thixotropic composition, providing an isocyanate, combining the thixotropic composition and the isocyanate to form a reaction mixture, and applying the reaction mixture to the substrate to form the composite article.

15 Claims, No Drawings

RIGID POLYURETHANE FOAM

FIELD OF THE DISCLOSURE

The instant disclosure generally relates to a rigid polyurethane foam which exhibits excellent application characteristics and insulation properties. The instant disclosure also relates to a composite article comprising the rigid polyurethane foam and a method of forming the composite article.

BACKGROUND OF THE DISCLOSURE

In the building, transportation, and appliance industries, polyurethane foam is used to insulate structures. As insulation, a polyurethane foam functions as a seamless and maintenance-free air barrier which provides many benefits, such as prevention of moisture infiltration and mold growth and reduction of energy use, e.g. a reduction in heating and/or cooling costs.

As is also known in the art, the polyurethane foam is formed from the exothermic reaction of a resin composition comprising a blowing agent and an isocyanate component, i.e., a polyurethane system. The resin composition includes a mixture of polyols, blowing agents, catalysts, and other components, and is typically supplied as a first component. The isocyanate component, which is reacted with the resin composition, is typically supplied as a second component. The resin composition includes various components. e.g. reactants, catalysts, blowing agents, which can react over time and reduce the shelf life of the resin composition. Further, the resin composition must exhibit theological properties which are conducive to the effective and efficient application of the resin composition, and a reaction mixture comprising the resin composition and the isocyanate component. To this end, the resin composition and the isocyanate component are selected to optimize the storage stability and application properties of the resin composition as well as the performance properties of a polyurethane foam article for a particular use, such as insulation.

Traditionally, physical blowing agents, such as chlorofluorocarbon blowing agents (CFCs) and hydrochlorofluorocarbon blowing agents (HCFCs), were used not only to foam the polyurethane, but also to help control the exothermic reaction between the resin composition and the isocyanate. Due to environmental concerns, CFCs were gradually phased out in favor of HCFCs. Recently, new regulations statutorily mandate the phasing-out of HCFCs in favor of the utilization of non-ozone depleting physical blowing agents, such as hydrofluoroolefin blowing agents (HFOs). The phase out of CFCs and HCFCs and the subsequent utilization of HFOs has brought about challenges with respect to the shelf life of the resin composition, which includes the HFO, as well as controlling the exothermic reaction between the resin composition and the isocyanate and the efficient formation of polyurethane foam which has the properties desired for particular uses, such as insulation.

As such, there remains an opportunity to provide a resin composition, a polyurethane foam, and a method of forming the polyurethane foam on a substrate to remedy problems commonly experienced with polyurethane foams formed with HFOs.

SUMMARY OF THE DISCLOSURE AND ADVANTAGES

A rigid polyurethane foam comprises the reaction product of an isocyanate and a thixotropic composition which is isocyanate reactive. The thixotropic composition comprises: (1) a first polyether polyol which is aromatic amine initiated and has ethylene oxide (EO) and propylene oxide (PO) end capping; (2) a second polyether polyol having a viscosity at 25° C. of from about 500 to about 15,000 cps; (3) a third polyether polyol having a viscosity at 25° C. of from about 18,000 to about 60,000 cps and a functionality of from about 5 to about 7; and (4) a hydrofluoroolefin. The thixotropic composition has a viscosity at 25° C. of from about 300 to about 5,000 cps.

A method of forming a composite article comprising a substrate and the rigid polyurethane foam includes the steps of providing the thixotropic composition, providing an isocyanate, combining the thixotropic composition and the isocyanate to form a reaction mixture, and applying the reaction mixture to the substrate to form the composite article.

Advantageously, the thixotropic composition exhibits excellent shelf life despite the inclusion of an hydrofluoroolefin and has excellent processing characteristics including rheological properties which facilitate cavity fill with minimal leakage. Further, the rigid polyurethane foam adheres well to a variety of substrates and has a low k-factor.

DETAILED DESCRIPTION OF THE DISCLOSURE

The instant disclosure includes a rigid polyurethane foam, a method of forming a composite article comprising a substrate and the rigid polyurethane foam, and a polyurethane system for use in forming the composite article. The rigid polyurethane foam comprises the reaction product of an isocyanate and a thixotropic composition which is isocyanate reactive.

Typically, the rigid polyurethane foam of the subject disclosure is used for providing thermal and/or acoustic insulation properties for composite articles formed from molds having complex shapes and used in the appliance, transportation (e.g. automotive), and building industries. However, it is to be appreciated that the rigid polyurethane foam of the subject disclosure may be used in other applications and in other industries.

The rigid polyurethane foam, the method of forming a composite article, and the polyurethane system are particularly useful for molding polyurethane foams in composite articles for use in various products such as such as refrigerators, freezers, icemakers, dishwashers, washing machines, dryers, and other appliances. In one embodiment, the composite article is further defined as a component (e.g. window, door, floor, side panel, etc.) in an appliance (e.g. a refrigerator, freezer, icemaker, dishwasher, washing machine, dryer, etc.), and automobile, or a building. In many embodiments, the rigid polyurethane foam functions as an insulator, thermally and acoustically, and as a structural adhesive to provide the component, e.g. window, door, floor, side panel, etc., with increased acoustic, insulative, and structural properties.

As used herein, the terminology "rigid polyurethane foam" describes a particular class of polyurethane foam and stands in contrast to flexible polyurethane foam. Rigid polyurethane foam is generally non-porous, having closed cells and minimal elastic characteristics, whereas flexible polyurethane foam is generally porous and has open cells.

Polyol selection impacts the stiffness of rigid polyurethane foams. Rigid polyurethane foams are typically produced from polyols having weight average molecular weights from about 250 to about 20,000 g/mol, hydroxyl numbers from about 20 to about 1,000 mg KOH/g. Moreover, rigid polyurethane foams are typically produced from polyols having high-functionality (f) initiators, i.e., f≥2, such as Mannich bases (f=4), toluenediamine (f=4), sorbitol (f=6), or sucrose (f=8). In contrast, flexible polyurethane foams are typically produced from polyols having higher molecular weights, lower hydroxyl numbers, and low-functionality initiators, i.e., f<4, such as dipropylene glycol (f=2) or glycerine (f=3). Rigid polyurethane foams are typically produced from polyfunctional polyols that create a three-dimensional cross-linked molecular structure which provides the rigid polyurethane foam with stiffness. Finally, rigid polyurethane foams are typically closed cell foams. The closed cells restrict the flow of air, noise, and heat/cold through the rigid polyurethane foam and also provide the rigid polyurethane foam with stiffness.

The rigid polyurethane foam of the subject disclosure may be open or closed celled and typically includes a highly cross-linked, polymer structure that provides excellent thermal and acoustic barrier properties, heat stability and flame resistance, and adhesive properties. Further, the rigid polyurethane foam typically has high compression strength at low density.

The rigid polyurethane foam of the instant disclosure typically has a closed cell content of greater than about 85, alternatively from about 85 to about 95, % when tested in accordance with ASTM D2856-94.

The rigid polyurethane foam of the instant disclosure typically has a density of from about 1.0 to about 15.0, alternatively from about 1.5 to about 5.0, alternatively from about 1.8 to about 3.5, pounds per cubic foot (PCF), i.e., about 16 to about 240, about 24 to about 80, about 28 to about 60, $kg/m^3$, when tested in accordance with ASTM D1622-14.

Thermal conductivity or k value is typically an indicator of the insulative/thermal barrier properties of an article such as the rigid polyurethane foam. Typically, the rigid polyurethane foam has a k-factor (k value) of from about 0.1 to about 0.3, alternatively from about 0.1 to about 0.25, alternatively from about 0.1 to about 0.2, alternatively about 0.15 $BTU.in/ft^2.hr.°$ F. at a 75° F. mean temperature when tested in accordance with ASTM C518-04.

The rigid polyurethane foam includes the reaction product of the isocyanate and the thixotropic composition in the presence of the blowing agent, i.e., the isocyanate and the polyols of the thixotropic composition chemically react in the presence of the blowing agent. The instant disclosure also describes a polyurethane system comprising the isocyanate and the thixotropic composition. The thixotropic component can also be referred to as an isocyanate reactive component or a resin composition. The system is typically provided in two or more discrete components, such as the isocyanate and the thixotropic composition, i.e., as a two-component (or 2K) system, which is described further below. It is to be appreciated that reference to the isocyanate and thixotropic composition, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other and mixed individually prior to application. As another example, a component typically included (and described herein as such) in the thixotropic composition may be mixed and used with the isocyanate.

The thixotropic composition includes polyols which are reactive with the isocyanate. Each polyol includes one or more OH functional groups, typically at least two OH functional groups. Typically, the polyols included in the thixotropic composition are selected from the group of polyether polyols, polyester polyols, polyether/ester polyols, biopolyols and combinations thereof; however, other polyols may also be employed.

More specifically, the thixotropic composition includes a first polyether polyol, a second polyether polyol, a third polyether polyol, and optionally additional polyols such as a polyester polyol and a Mannich polyol. The first polyether polyol, the second polyether polyol, the third polyether polyol, the polyether polyol, and the Mannich polyol are different from one another.

Polyether polyols as described herein and suitable for purposes of the present invention include, but are not limited to, products obtained by the polymerization of a cyclic oxide (i.e. an alkylene oxide), for example, ethylene oxide (EO), propylene oxide (PO), butylene oxide (BO), or tetrahydrofuran in the presence of polyfunctional initiators. In one embodiment, the isocyanate-reactive component comprises a polyether polyol. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

To this end, polyether polyols as described herein are polyols that include a plurality of alkyleneoxy groups. The term alkyleneoxy group describes a mer, or unit. The alkyleneoxy group is the unit which results from the polymerization of the alkylene oxide, e.g. EO groups, PO groups, and BO groups. If referenced, the amount of alkyleneoxy groups in the polyether polyols is referenced in parts by weight, based on the total weight of the alkyleneoxy groups used to form the polyether polyol. The plurality of alkyleneoxy groups may be arranged to form polyether polyols which are described as polyols having random alkyleneoxy groups (which make up heteric segments), polymers having repeating alkyleneoxy groups, and polymers having blocked alkyleneoxy groups. The plurality of polymeric side chains have alkoxyl end caps selected from the group of ethyleneoxy end caps, propyleneoxy end caps, butyleneoxy end caps, and combinations thereof. The amount of alkyleneoxy end caps in the polyether polyols is referenced in percent (%), based on the total number of end caps in a sample of the particular polyether polyol. For example, if the first polyether polyol comprises about 100% ethyleneoxy (EO) end caps, based on the total number of end caps, to this end about 100% of the end caps in a sample of the first polyether polyol terminate with a primary hydroxyl group formed from ethylene oxide, i.e, an EO end cap.

Suitable non-limiting polyether polyols are commercially available from BASF Corporation under the PLURACOL® brand of polyol.

As set forth above, the thixotropic composition includes the first polyether polyol. The first polyether polyol typically has a relatively high functionality and relatively low molecular weight (e.g. a higher hydroxyl value) and, as such, would be considered by one of skill in the art to be a "rigid polyol." Rigid polyols, such as the first polyether polyol, typically provide the rigid polyurethane foam with rigidity, energy efficiency, and dimensional stability.

The first polyether polyol typically has a functionality of greater than about 2, alternatively greater than about 3, alternatively from about 3 to about 5, alternatively about 4; a hydroxyl value of from about 30 to about 1,100, alternatively from about 200 to about 900, alternatively from about 300 to about 500, mg KOH/g; and a viscosity at 25° C. of from about 15,000 to about 25,000, alternatively from about 16,000 to about 23,000, alternatively from about 17,000 to about 21,000, cps when tested in accordance with ASTM D2196-15. The properties of the first polyether polyol may vary outside of the ranges above, but are typically both whole and fractional values within these ranges. That is, the functionality, the hydroxyl value, and the viscosity of the first polyether polyol may be any value or range of values, both whole and fractional, within those ranges and values described above and/or may vary from the values and/or range of values above by ±5%, ±10%, ±15%, ±20%, ±25%, ±30%, etc.

In some embodiments, the first polyether polyol is an amine initiated polyol, e.g. an aromatic amine initiated polyol. Said differently, the first polyether polyol is formed from an amine "initiator." An initiator, also referred to as a starter, functions as a reaction base for compounds, such as alkylene oxides, which are polymerized to form polyols, and also serves to anchor polyols during formation. The first polyether polyol of these embodiments can comprise EO groups and PO groups and have various percentages of EO capping. For example, in some embodiments, the first polyether polyol has about 100% EO capping. More specifically, by "about" 100% EO capping, it is meant that all intended capping of the first polyether polyol is EO capping, with any non-EO capping resulting from trace amounts of other alkylene oxides or other impurities. As such, the capping is typically about 100% EO capping, but may be slightly lower, such as at least about 99% ethylene oxide capping, depending on process variables and the presence of impurities during the production of the first polyether polyol. In other embodiments, the first polyether polyol mixed capping, e.g. a certain percentage of EO capping and a corresponding percentage of PO capping.

In one embodiment, the first polyether polyol is an aromatic amine initiated polyether polyol with EO and PO capping which has a specific gravity of about 1.08 g/cm$^3$ at 73° C., a viscosity of about 18,600 cps at 25° C. (77° F.), a functionality of about 4, a weight average molecular weight of about 570 g/mol, and a hydroxyl number of about 390 mg KOH/g.

In various embodiments, the first polyether polyol is present in the thixotropic composition in an amount of from about 25 to about 65, alternatively from about 30 to about 60, alternatively from about 30 to about 50, alternatively from about 35 to about 65, alternatively from about 45 to about 55, alternatively from about 30 to about 40, alternatively from about 45 to about 50, parts by weight, based on 100 parts by weight of said thixotropic composition. The amount of the first polyether polyol may vary outside of the ranges above, but is typically both whole and fractional values within these ranges.

As set forth above, the thixotropic composition also includes the second polyether polyol. The second polyether polyol is a lower viscosity, higher functionality polyol which works in concert with the third polyether polyol to impart thixotropic properties on the thixotropic composition.

The second polyether polyol typically has a functionality of greater than about 2, alternatively greater than about 3, alternatively from about 4 to about 5, alternatively about 4.5; a hydroxyl value of from about 200 to about 1,000, alternatively from about 300 to about 800, alternatively from about 300 to about 600, alternatively from about 300 to about 450, mg KOH/g; and a viscosity at 25° C. (77° F.) of from about 500 to about 15,000, alternatively from about 1,000 to about 7,000, alternatively from about 2,000 to about 5,000, cps when tested in accordance with ASTM D2196-15. The properties of the second polyether polyol may vary outside of the ranges above, but are typically both whole and fractional values within these ranges. That is, the functionality, the hydroxyl value, and the viscosity of the second polyether polyol may be any value or range of values, both whole and fractional, within those ranges and values described above and/or may vary from the values and/or range of values above by ±5%, ±10%, ±15%, ±20%, ±25%, ±30%, etc.

In various embodiments, the second polyether polyol is a sucrose/glycerine initiated rigid polyether polyol with PO capping.

In one embodiment, the second polyether polyol is a sucrose/glycerine initiated polyether polyol having a specific gravity of about 1.08 g/cm$^3$ at 25° C. (77° F.), a viscosity of about 3,500 cps at 25° C. (77° F.), a functionality of about 4.5, a weight average molecular weight of about 610, and a hydroxyl number of about 368 mg KOH/g.

In various embodiments, the second polyether polyol is present in the thixotropic composition in an amount of from about 1 to about 10, alternatively from about 3 to about 7, parts by weight, based on 100 parts by weight of said thixotropic composition. The amount of the second polyether polyol may vary outside of the ranges above, but is typically both whole and fractional values within these ranges.

As set forth above, the thixotropic composition also includes the third polyether polyol. In contrast to the second polyether polyol, the third polyether polyol is a higher viscosity, higher functionality polyol which works in concert with the second polyether polyol to impart thixotropic properties on the thixotropic composition.

The third polyether polyol typically has a functionality of greater than about 2, alternatively greater than about 4, alternatively from about 5 to about 7, alternatively from about 5 to about 6, alternatively about 5, alternatively about 5.5; a hydroxyl value of from about 200 to about 1,000, alternatively from about 300 to about 800, alternatively from about 450 to about 600, mg KOH/g; a viscosity at 25° C. (77° F.) of from about 18,000 to about 60,000, alternatively from about 18,000 to about 50,000, alternatively from about 30,000 to about 40,000, cps when tested in accordance with ASTM D2196-15. The properties of the third polyether polyol may vary outside of the ranges above, but are typically both whole and fractional values within these ranges. That is, the functionality, the hydroxyl value, and the viscosity of the third polyether polyol may be any value or range of values, both whole and fractional, within those ranges and values described above and/or may vary from the values and/or range of values above by ±5%, ±10%, ±15%, ±20%, ±25%, ±30%, etc.

In various embodiments, the third polyether polyol is a sucrose/glycerine initiated rigid polyether polyol with PO capping.

In one embodiment, the third polyether polyol is a sucrose/glycerine initiated rigid polyether polyol and which has a specific gravity of about 1.13 g/cm$^3$ at 25° C. (77° F.), a viscosity of about 18,500 cps at 25° C. (77° F.), a functionality of about 5, a weight average molecular weight of about 640 g/mol, and a hydroxyl number of about 450 mg KOH/g.

In another embodiment, the third polyether polyol is a sucrose/glycerine initiated rigid polyether polyol having a specific gravity of about 1.08 g/cm$^3$ at 25° C. (77° F.), a viscosity of about 35,000 cps at 25° C. (77° F.), a functionality of about 5.5, a weight average molecular weight of about 657, and a hydroxyl number of about 470 mg KOH/g.

In various embodiments, the third polyether polyol is present in the thixotropic composition in an amount of from about 5 to about 30, alternatively from about 5 to about 25, alternatively from about 5 to about 20, alternatively from about 10 to about 30, alternatively from about 10 to about 20, parts by weight, based on 100 parts by weight of said thixotropic composition. The amount of the third polyether polyol may vary outside of the ranges above, but is typically both whole and fractional values within these ranges.

As described above, the thixotropic composition includes the second polyether polyol and the third polyether polyol. In many embodiments, the second and third polyether polyols are present in a ratio of from about 1:1 to about 1:7, alternatively from about 1:2 to about 1:4. In such preferred embodiments, the thixotropic composition can also include the polyester polyol as described immediately below.

The thixotropic composition may further include a polyester polyol. The polyester polyol can be an aromatic or an aliphatic polyester polyol. The polyester polyol is typically an aromatic polyester polyol. The aromatic polyester polyol typically provides the rigid polyurethane foam with rigidity, energy efficiency, dimensional stability, and flame resistance. The aromatic polyester polyol is typically formed via the condensation of a glycol and a dicarboxylic acid or acid derivative. The functionality, structure, and molecular weight of the polyester polyol can be varied to tailor the processing characteristics of the polyurethane system and the physical properties of the rigid polyurethane to a particular application.

The polyester polyol typically has a functionality of greater than about 1.5, alternatively from about 2 to about 4, alternatively from about 2 to about 3, alternatively about 2, alternatively about 2.3, alternatively about 3; a hydroxyl value of from about 100 to about 500, alternatively from about 150 to about 350, alternatively from about 200 to about 300, alternatively from about 240 to about 290, mg KOH/g; a viscosity at 25° C. (77° F.) of from about 7,000 to about 20,000, alternatively from about 8,000 to about 16,000, alternatively from about 9,000 to about 14,000, cps when tested in accordance with ASTM D2196-15. The properties of the polyester polyol may vary outside of the ranges above, but are typically both whole and fractional values within these ranges. That is, the functionality, the hydroxyl value, and the viscosity of the polyester polyol may be any value or range of values, both whole and fractional, within those ranges and values described above and/or may vary from the values and/or range of values above by ±5%, ±10%, ±15%, ±20%, ±25%, ±30%, etc. Suitable non-limiting aromatic polyester polyols are commercially available from BASF Corporation under the LUPRAPHEN® brand of polyols.

In one embodiment, the polyester polyol is an aromatic polyester polyol having a specific gravity of about 1.26 g/cm$^3$, a viscosity at 25° C. (77° F.) of about 12,000 cps, a functionality of about 2.3, and a hydroxyl number of about 265 mg KOH/g.

In various embodiments, the polyester polyol is present in the thixotropic composition in an amount of from about 10 to about 30, alternatively from about 15 to about 25, parts by weight, based on 100 parts by weight of said thixotropic composition. The amount of the polyester polyol may vary outside of the ranges above, but is typically both whole and fractional values within these ranges.

The thixotropic composition may further include a Mannich polyol. In some embodiments, the Mannich polyol is based on a Mannich base. The Mannich polyol of these embodiments typically comprises EO groups and PO groups and has various percentages of EO capping. The Mannich polyol can have homogeneous or mixed capping, e.g. a certain percentage of EO capping and a corresponding percentage of PO capping. That is, the Mannich polyol can have from 0 to 100% EO capping and from 0 to 100% PO capping. In some embodiments, the Mannich polyol has from about 5 to about 50, about 10 to about 30, or about 20, % EO capping.

The functionality, structure, and molecular weight of the Mannich polyol can be varied to tailor the processing characteristics of the polyurethane system and the physical properties of the rigid polyurethane to a particular application. The Mannich polyol typically has a functionality of greater than about 2, alternatively from about 2 to about 6, alternatively from about 3 to about 5, alternatively about 4; a hydroxyl value of from about 200 to about 600, alternatively from about 300 to about 500, alternatively from about 400 to about 450, alternatively from about 415 to about 435, mg KOH/g; a viscosity at 25° C. (77° F.) of from about 2,000 to about 8,000, alternatively from about 3,500 to about 6,500, alternatively from about 4,500 to about 5,500, cps when tested in accordance with ASTM D2196-15. The properties of the Mannich polyol may vary outside of the ranges above, but are typically both whole and fractional values within these ranges. That is, the functionality, the hydroxyl value, and the viscosity of the Mannich polyol may be any value or range of values, both whole and fractional, within those ranges and values described above and/or may vary from the values and/or range of values above by ±5%, ±10%, ±15%, ±20%, ±25%, ±30%, etc.

In one embodiment, the Mannich polyol is a Mannich polyol having a specific gravity of about 1.11 g/cm$^3$, a pH of about 11, a viscosity at 25° C. (77° F.) of about 5,200 cps, a functionality of about 4, and a hydroxyl number of about 415 to about 435 mg KOH/g.

In various embodiments, the Mannich polyol is present in the thixotropic composition in an amount of from about 1 to about 20, alternatively from about 5 to about 15, alternatively from about 5 to about 9, parts by weight, based on 100 parts by weight of said thixotropic composition. The amount of the Mannich polyol may vary outside of the ranges above, but is typically both whole and fractional values within these ranges.

Of course, thixotropic composition can include more than one of the polyols described above and can also include a supplemental polyol. The supplemental polyol can be any polyol not specified above such as bio-based polyol such as glycerin or castor oil, a graft polyol, etc. An exemplary graft polyol is a polyol comprising dispersed polymer solids chemically grafted to a carrier polyol, e.g. the carrier polyol and particles of co-polymerized styrene and acrylonitrile, wherein the particles of co-polymerized styrene and acrylonitrile are dispersed in the carrier polyol.

The thixotropic composition includes a blowing component. The blowing component comprises the blowing agents which are included in the thixotropic composition. The blowing component includes a hydrofluoroolefin (HFO), and in many embodiments the blowing component also includes water.

As set forth above, the blowing component includes a HFO. HFOs are chemical compounds comprising hydrogen, fluorine, and carbon atoms. HFOs are distinguished from hydrofluorocarbons (HFCs) by being derivatives of alkenes (olefins) rather than alkanes. In some embodiments, the HFO is selected from the group of trans-1-chloro-3,3,3-trifluoropropene, 2,3,3,3-tetrafluoropropene, 1,3,3,3-tetrafluoropropene, and combinations thereof. In a preferred embodiment, the HFO is or comprises trans-1-chloro-3,3,3-trifluoropropene. In some embodiments, the HFO is present in the thixotropic composition in an amount of from about 10 to about 40, alternatively from about 20 to about 30, parts by weight, based on 100 parts by weight of said thixotropic composition. The amount of the HFO may vary outside of the ranges above, but is typically both whole and fractional values within these ranges.

HFO's are physical blowing agents. Inclusion of one or more physical blowing agents in the blowing component is believed to reduce the thermal conductivity of the polyurethane foam coating. Physical blowing agents typically boil the exotherm foaming temperature or less, preferably at about 50° C., or less. The thixotropic composition can include additional physical blowing agents. Preferred additional physical blowing agents include those which have a zero ozone depletion potential. Examples of physical blowing agents include volatile non-halogenated hydrocarbons having 2 to 7 carbon atoms such as alkanes, alkenes, cycloalkanes having up to 6 carbon atoms, dialkyl ether, cycloalkylene ethers and ketones; and HFCs. Suitable additional physical blowing agents for the purposes of the subject disclosure may include HFCs, chlorofluorocarbons (CFCs), hydrocarbons, and combinations thereof.

The thixotropic composition can include additional chemical blowing agents. In many embodiments, the blowing component also includes a chemical blowing agent, such as water and/or formic acid. In some embodiments, water is present in the thixotropic composition in an amount of from about 0.5 to about 10, alternatively from about 1 to about 5, alternatively from about 1 to about 2, parts by weight, based on 100 parts by weight of said thixotropic composition. The amount of the water may vary outside of the ranges above, but is typically both whole and fractional values within these ranges.

The thixotropic composition may include one or more catalysts. The catalyst is typically present in the thixotropic composition to catalyze the reaction between the isocyanate and the polyols.

It is to be appreciated that the catalyst is typically not consumed in the exothermic reaction between the polyols of the thixotropic composition and the isocyanate. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc. If included, the catalyst can be included in various amounts.

The thixotropic composition typically includes an amine catalyst. Suitable amine catalysts for purposes of the present disclosure include, but are not limited to, catalytic amines, such as primary, secondary, and tertiary, cyclic and acyclic catalytic amines. One non-limiting example of a suitable catalyst is N,N-dimethylcyclohexylamine.

In addition to the catalyst, the thixotropic composition may include one or more surfactants. The surfactant typically supports homogenization of the blowing agent and the polyol and regulates a cell structure of the polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One specific, non-limiting example of a surfactant is a silicone-polyether block copolymer. If included, the surfactant may be included in the thixotropic composition in various amounts.

In some embodiments, the thixotropic composition includes a surfactant which has a viscosity of from about 300 to about 2,500 cps at 25° C. (77° F.). In a preferred embodiment, the thixotropic composition includes organosilicone copolymer surfactant having a viscosity of 1800-2500 cps at 25° C. (77° F.). If included, the surfactant of this embodiment may be included in the thixotropic composition in various amounts.

In addition to the surfactant, the thixotropic composition optionally includes a flame retardant. The flame retardant may include any suitable flame retardant or mixtures of flame retardants known in the art. Non-limiting examples of suitable flame retardants include tricresyl phosphate, tris(2-chloroethyl) phosphate, tris(2-chloropropyl) phosphate (TCPP), tris(2,3-dibromopropyl) phosphate, red phosphorous, aluminum oxide hydrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, melamine, and corn starch. One specific, non-limiting example of a surfactant is TCPP. If included, the flame retardant can be included in the thixotropic composition in various amounts.

The thixotropic composition may optionally include one or more additional additives. The one or more additives included may be any suitable additive or mixtures of additives known in the art. Suitable additives for purposes of the instant disclosure include, but are not limited to, chain-extenders, crosslinkers, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the thixotropic composition in various amounts.

The thixotropic composition is typically an amber liquid which has a viscosity of less than about 1000, alternatively from about 300 to about 5000, alternatively from about 300 to about 1000, alternatively from about 400 to about 1000, alternatively from about 500 to about 1000, alternatively from about 500 to about 900, alternatively from about 500 to about 800, alternatively from about 550 to about 700, cps at 25° C. (77° F.).

The thixotropic composition is chemically stable, it can be recycled and has an excellent shelf life. Shelf life can be defined as a period of time over which the thixotropic composition produces foam having consistent properties, and/or a period of time over which the components of the thixotropic composition are stable. From a practical perspective, the shelf life is the period of time over which the quality of the foam produced with the thixotropic composition does not deteriorate to a predetermined extent (i.e. the foam produced with the thixotropic composition meets certain quality requirements). To this end, in many embodiments, the thixotropic composition has a shelf life of greater than about 3, alternatively greater than about 5, alternatively greater than about 5, alternatively greater than about 6, alternatively greater than about 7, alternatively greater than about 8, months when stored at 25° C. (77° F.). Said differently, the thixotropic composition can be stored for 3, 4, 5, 6, 7, 8, or even more months, and the components thereof, e.g. the amine catalyst and the trans-1-chloro-3,3,3-trifluoropropene and other components, do not interact, chemically or otherwise, to reduce the reactivity of the resin and negatively impact the properties of the polyurethane foam article formed therefrom.

The polyurethane system of the present disclosure also includes the isocyanate. The isocyanate may be, consist essentially of, comprise, or include a polyisocyanate having two or more functional groups, e.g. two or more NCO functional groups. Of course, the polyurethane system can include one or more types of isocyanate. Any combination of the different types of the isocyanate described herein can be included in the polyurethane system. Suitable isocyanates for purposes of the present disclosure include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used for purposes of the present disclosure include, but are not limited to, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate.

In a preferred embodiment, the isocyanate component includes MDIs and pMDIs. In another preferred embodiment, the isocyanate component consists essentially of MDIs and pMDIs, this embodiment is substantially free of (comprises <1% by weight) additional isocyanates. In yet another preferred embodiment, the isocyanate component consists of MDIs and pMDIs.

The isocyanate typically has: a NCO content of from about 25 to about 33, alternatively from about 30.5 to about 32, alternatively from about 31 to about 31.5, alternatively about 31.0, alternatively about 31.5, alternatively about 31.3, weight percent; a nominal functionality of from about 2 to about 3.5, alternatively from about 2.5 to about 3.1, alternatively from about 2.6 to about 3.1, alternatively about 2.7, alternatively about 3.5, alternatively about 2.9; and a viscosity of from about 60 to about 2000, alternatively from about 150 to about 750, alternatively about 200, alternatively about 350, alternatively about 700, alternatively about 450, cps at 25° C. (77° F.) when tested in accordance with ASTM D2196-15. In one embodiment, the thixotropic composition has a higher viscosity than the isocyanate.

In one embodiment the isocyanate comprises pMDI. For example, a suitable isocyanate includes polymeric diphenylmethane diisocyanate, has a NCO content of about 31.5 weight percent, a nominal functionality of about 2.7, and a viscosity of about 200 cps at 25° C. (77° F.). As another example, a suitable isocyanate includes pMDI, has a NCO content of about 31 weight percent, a nominal functionality of about 3, and a viscosity of about 700 cps at 25° C. (77° F.). As yet another example, a suitable isocyanate includes pMDI, has a NCO content of about 31.3 weight percent, a nominal functionality of about 2.9, and a viscosity of about 450 cps at 25° C. (77° F.). As a final example, a suitable isocyanate includes pMDI, has a NCO content of about 31.3 weight percent, a nominal functionality of about 2.9, and a viscosity of about 350 cps at 25° C. (77° F.).

Specific isocyanates that may be used to prepare the rigid polyurethane foam are commercially available from BASF Corporation under the LUPRANATE® brand or the ELASTOCOOL® brand of isocyanates.

The isocyanate and the thixotropic composition are reacted to form the rigid polyurethane foam. In one embodiment, the rigid polyurethane foam also includes the reaction products of the isocyanate with itself. In this embodiment, the rigid polyurethane foam may include isocyanurate groups, uretdione groups, carbodiimide groups, and combinations thereof. In one specific embodiment, the rigid polyurethane foam includes isocyanurate groups. i.e., includes both urethane groups and isocyanurate groups.

As set forth above, the instant disclosure also provides a method of forming a composite article comprising a substrate and the rigid polyurethane foam. The method includes the steps of providing the thixotropic composition, providing an isocyanate, combining the thixotropic composition and the isocyanate to form a reaction mixture, and applying the reaction mixture to the substrate to form the composite article. In this method, the thixotropic composition, and the isocyanate are just as described above.

The composite article is typically an appliance such as a refrigerator. However, it is to be appreciated that the composite article is not limited to appliances, but may be utilized in other applications such as in motor vehicles and architectural applications such as doors, walls, molding, and windows. Further, it is to be appreciated that the composite article of the present disclosure is not limited to the applications set forth herein, but rather may also be useful for other applications requiring improved flow of polyurethane compounds within molds and improved thermal and/or acoustic insulation properties, such as, for example, in homes and in motor vehicles.

The polyols of the thixotropic composition and the isocyanate are typically combined at an isocyanate index of from about 100 to about 500, alternatively from about 110 to about 250, alternatively from about 170 to about 230. The terminology "isocyanate index" is defined as the ratio of NCO groups in the isocyanate to hydroxyl groups in the thixotropic composition multiplied by 100. The isocyanate index can be varied based on the desired composition of the rigid polyurethane foam. For example, intermediate isocyanate indexes, e.g. about 110 to about 250, can be used to make the rigid polyurethane foam which is a hybrid polyurethane/polyisocyanurate. As another example, higher isocyanate indexes, e.g. greater than about 250, can be used to make the rigid polyurethane foam which is a predominately polyisocyanurate.

The rigid polyurethane foam of the instant disclosure may be combined by mixing the isocyanate and the thixotropic composition to form a mixture at ambient or at elevated temperatures, e.g. −12 to 66° C. (10 to 150° F.). More specifically, in one embodiment, the method includes the step of heating the thixotropic composition and the isocyanate to a temperature of from about 21 to about 54° C. (about 70 to about 130° F.), alternatively from about 27 to about 32° C. (about 80 to about 90° F.) prior to the step of combining the isocyanate reactive thixotropic composition with the isocyanate. Once combined, the isocyanate and the thixotropic composition form a reaction mixture.

The substrate upon which the reaction mixture is applied may be any surface and may include one or more of any type of material, such as a metal (including alloys), coated metal, polymeric material, etc. Suitable, non-limiting examples of metal substrates include cold rolled steel, stainless steel, aluminum, galvanized, galvanneal, and galvalum substrates. Suitable, non-limiting examples of coated metal substrates include polyester, polyurethane, and epoxy coated substrates.

In certain embodiments in which the rigid polyurethane foam is produced in a mold, e.g. to form an appliance, it is to be appreciated that the isocyanate and the thixotropic composition may be mixed to form the reaction mixture prior to disposing the mixture in the mold. For example, the reaction mixture may be poured into an open mold or the mixture may be injected into a closed mold. Alternatively, the isocyanate and the thixotropic composition may be mixed to form the mixture within the mold. In these embodiments, upon completion of the rigid polyurethane foaming reaction, the rigid polyurethane foam takes the shape of the mold. The rigid polyurethane foam may be produced in, for example, low pressure molding machines, low pressure slabstock conveyor systems, high pressure molding machines, including multi-component machines, high pressure slabstock conveyor systems, and/or by hand mixing. Advantageously, the subject thixotropic composition has an excellent viscosity profile which facilitates excellent cavity fill. Once formed, the rigid polyurethane foam is aestically pleasing and has a fine and consistent cell structure.

The rigid polyurethane foam exhibits about 3.9 mm or less, alternatively about 3.5 mm or less, alternatively about 3.0 mm or less, post-foam expansion at a demold time of about 165 seconds. The rigid polyurethane foam exhibits about 3.5 mm or less, alternatively about 2.8 mm or less, alternately about 2.4 mm or less, post-foam expansion at a demold time of about 180 seconds. The rigid polyurethane foam exhibits about 1.5 mm or less, alternatively about 1.3 mm or less, alternatively about 1.0 mm or less, post-foam expansion at a demold time of about 240 seconds.

To test demold time, 10×10×2.5 inch foam blocks are formed in a mold and demolded at different times. Regarding process parameters, the throughput is around 150 gram/second and the shot size is about 0.9 seconds. Regarding molding parameters, the mold temperature of the mold is 120° F. and a thin layer of mold release is applied to the surfaces of the mold to aid the demolding process. Once the block is molded for the desired demold time, e.g. 165 seconds, the thickness of each block is measured at four points spaced equidistance apart and about 1.5 inches from the center of the top surface of the block. The four thickness measurements are averaged to obtain the linear post-foam expansion.

The following examples are intended to illustrate the instant disclosure and are not to be viewed in any way as limiting to the scope of the instant disclosure.

EXAMPLES

Examples 1-4 are rigid polyurethane foams formed with an isocyanate-reactive thioxotropic composition and an isocyanate in accordance with the instant disclosure. Comparative Example 1 is a rigid polyurethane foam which is not formed using a high-viscosity thioxotropic isocyanate reactive composition. As such, Comparative Example 1 is not formed in accordance with the instant disclosure and is included for comparative purposes. The thixotropic compositions of Examples 1-4 and comparative composition of Comparative Example 1 are formed using the isocyanate reactive components set forth below in Table 1. The physical properties of Examples 1-4 and Comparative Example 1 are set forth further below in Table 2.

The amounts in Table 1 are in percent by weight, based on 100 percent by weight of the thixotropic component. The isocyanate reactive components set forth in Table 1 are reacted at an isocyanate index of 100 to 140 to form the rigid polyurethane foams of Examples 1-4 and Comparative Example 1. As is well known in the art, isocyanate index is a measure of an actual molar amount of isocyanate reacted with the polyols of isocyanate reactive component relative to a theoretical molar amount of isocyanate needed to react with an equivalent molar amount of the polyols, and isocyanate index is calculated using the following formula:

$$\text{Isocyanate Index} = \left[ \frac{\text{Actual amount of isocyanate used}}{\text{Theoretical amount of isocyanate required}} \right] \times 100$$

TABLE 1

| Component | Comp. Ex. (wt. %) | Ex. 1 (wt. %) | Ex. 2 (wt. %) | Ex. 3 (wt. %) | Ex. 4 (wt. %) |
|---|---|---|---|---|---|
| Thixotropic Composition/Comparative Composition | | | | | |
| Polyol A | 37.368 | 47.104 | 47.104 | 47.564 | 34.1 |
| Polyol B | 12.782 | 17.345 | — | — | — |
| Polyol C | — | — | 17.345 | 16.795 | 10 |
| Polyol D | 15.038 | 19.577 | 19.577 | 18.974 | 13 |
| Polyol E | 4.511 | 5.833 | 5.833 | 5.833 | 4 |
| Polyol F | — | — | — | — | 7 |
| Calalyst A | — | 3.177 | 3.177 | 3.177 | 2.6 |
| Catalyst B | 0.301 | 0.401 | 0.401 | 0.401 | 0.25 |
| Surfactant A | — | 5.041 | 5.041 | 5.041 | 4.7 |
| Surfactant B | 2.857 | — | — | — | — |
| Blowing Agent A | 1.521 | 1.521 | 1.521 | 1.521 | 1.35 |
| Blowing Agent B | — | 24.400 | 24.400 | 24.400 | 23 |
| Blowing Agent C | 24.400 | — | — | — | — |
| Total | 100.0 | 100.0 | 100.0 | 100.0 | 100.0 |
| Viscosity at 25° C. cps ASTM D2196-15 | — | 300 | 430 | 690 | 600 |
| Two weeks @ 50° C. (equivalent to 14 weeks at room temperature) | — | Pass | Pass | Pass | — |
| Isocyanate (mixture of MDI, pMDI) | | | | | |
| Isocyanate Index | 100-140 | 100-140 | 100-140 | 100-140 | 100-140 |

Polyol A is an aromatic amine initiated rigid polyether polyol with EO end capping which has a specific gravity of about 1.08 g/cm$^3$ at 73° C. a viscosity of about 18,600 cps at 25° C. (77° F.), a functionality of about 4, a weight average molecular weight of about 539 g/mol, and a hydroxyl number of about 405 mg KOH/g. Polyol A is an example of the first polyether polyol described above.

Polyol B is a sucrose/glycerine initiated rigid polyether polyol which has a specific gravity of about 1.13 g/cm$^3$ at 25° C. (77° F.), a viscosity of about 18,500 cps at 25° C. (77° F.), a functionality of about 5, a weight average molecular weight of about 640 g/mol, and a hydroxyl number of about 450 mg KOH/g. Polyol B is an example of the third polyether polyol described above.

Polyol C is a sucrose/glycerine initiated rigid polyether polyol having a specific gravity of about 1.08 g/cm$^3$ at 25° C. (77° F.), a viscosity of about 35,000 cps at 25° C. (77° F.), a functionality of about 5.5, a weight average molecular weight of about 657, and a hydroxyl number of about 470 mg KOH/g. Polyol C is an example of the third polyether polyol described above.

Polyol D is an aromatic polyester polyol having a specific gravity of about 1.26 g/cm$^3$, a viscosity at 25° C. (77° F.) of about 12,000 cps, a functionality of about 2.3, and a hydroxyl number of about 265 mg KOH/g. Polyol D is an example of the polyester polyol described above.

Polyol E is a sucrose/glycerine initiated rigid polyether polyol with a polyethylene terphthalate structure (known as a PET polyol) having a specific gravity of about 1.08 g/cm$^3$ at 25° C. (77° F.), a viscosity of about 3,500 cps at 25° C. (77° F.), a functionality of about 4.5, a weight average molecular weight of about 610, and a hydroxyl number of about 368 mg KOH/g. Polyol E is an example of the second polyether polyol described above.

Polyol F is a Mannich polyol (based on a Mannich base) having a specific gravity of about 1.11 g/cm$^3$ at 25° C. (77° F.), a viscosity of about 5,200 cps at 25° C. (77° F.), a functionality of about 4, and a hydroxyl number of about 415 to about 435 mg KOH/g. Polyol F is an example of the Mannich polyol described above.

Catalyst A is an amine catalyst.
Catalyst B is another amine catalyst.
Surfactant A is a silicone surfactant.
Surfactant B is another silicone surfactant.
Blowing Agent A is water.
Blowing Agent B is trans-1-chloro-3,3,3-trifluoropropene.
Blowing Agent C is 1,1,1,3,3-Pentafluoropropane.

Each of the isocyanate reactive components of Examples 1-4 and Comparative Example 1 are machine mixed to form a reaction mixture. The isocyanate reactive components and the isocyanate are mixed at a temperature of about 75° F. (23.9° C.) and at an isocyanate index of about 190. In turn, test samples of rigid foam are formed for testing and corresponding test data is set forth in Table 2 below.

TABLE 2

| Component | Comp. Ex. | Ex. 1 | Ex. 2 | Ex. 3 |
|---|---|---|---|---|
| Post-Foam Expansion (mm) Demold Time 165 seconds | 4.4 | 3.9 | 3.5 | 3.0 |
| Post-Foam Expansion (mm) Demold Time 180 seconds | 3.9 | 3.5 | 2.8 | 2.4 |
| Post-Foam Expansion (mm) Demold Time 240 seconds | 1.8 | 1.5 | 1.3 | 1.0 |
| Fill Density lbs/ft$^3$ ASTM D1622/ D1622M-14 | 1.89 | 1.86 | 1.89 | 1.89 |
| Compressive Modulus- Parallel (psi) ASTM D1621-00 | 511 | 529 | 475 | 515 |

TABLE 2-continued

| Component | Comp. Ex. | Ex. 1 | Ex. 2 | Ex. 3 |
|---|---|---|---|---|
| Compressive Modulus-Perpendicular (psi) ASTM D1621-00 | 405 | 321 | 459 | 497 |
| k-Factor (Brett Mold Data-ASTM C518-04) BTU · in/ft² · hr · °F.* | | | | |
| Top of Brett (75° C.) | 0.128 | 0.126 | 0.124 | 0.122 |
| Bottom of Brett (75° C.) | 0.124 | 0.123 | 0.173 | 0.121 |
| Top of Brett (35° C.) | 0.118 | 0.115 | 0.113 | 0.112 |
| Bottom of Brett (35° C.) | 0.115 | 0.112 | 0.112 | 0.111 |

*Initial testing indicates that Ex. 4 exhibits improved demold time, k-Factor, and finer cells with a more stable foam than Comparative Example and Examples 1-3.

Referring now to Table 2, the rigid polyurethane foams of Examples 1-3 exhibit similar fill density, reduced foam leakage, improved surface finish, and improved energy efficiency over the rigid polyurethane foam of Comparative Example. Regarding energy consumption and loss of blowing agent, testing confirmed that the rigid polyurethane foams of Examples 2 and 3 exhibited 5% loss in blowing agent and a loss in energy consumption over Comparative Example as well. Further, the rigid polyurethane foams of Examples 1-3 exhibit a significant improvement in k-factor over the rigid polyurethane foam of Comparative Example.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A rigid polyurethane foam comprising the reaction product of:
   (A) a thixotropic composition which is isocyanate reactive, said thixiotropic composition comprising;
      (i) a first polyether polyol which is aromatic amine initiated and has ethylene oxide and propylene oxide end capping;
      (ii) a second polyether polyol having a viscosity at 25° C. of from about 500 to about 15,000 cps when tested in accordance with ASTM D2196-15;
      (iii) a third polyether polyol having a viscosity at 25° C. of from greater than about 18,000 to about 60,000 cps when tested in accordance with ASTM D2196-15, and a functionality of from about 5 to about 7; and
      (iv) a hydrofluoroolefin;
      wherein said first, second, and third polyether polyols are different and said thixotropic composition has a viscosity at 25° C. of from about 300 to about 5,000 cps when tested in accordance with ASTM D2196-15; and
      said first polyether polyol is present in said thixotropic composition in an amount of from about 30 to about 60 parts by weight, based on 100 parts by weight of said thixotropic composition;
      said second polyether polyol is present in said thixotropic composition in an amount of from about 1 to about 10 parts by weight, based on 100 parts by weight of said thixotropic composition;
      said third polyether polyol is present in said thixotropic composition in an amount of from about 5 to about 30 parts by weight, based on 100 parts by weight of said thixotropic composition; and
   (B) an isocyanate.

2. A rigid polyurethane foam as set forth in claim 1 wherein said third polyether polyol has a viscosity at 25° C. of from greater than about 30,000 to about 40,000 cps when tested in accordance with ASTM D2196-15 and/or a functionality of from about 5 to about 6.

3. A rigid polyurethane foam as set forth in claim 1 wherein said second polyether polyol has a viscosity at 25° C. of from about 1,000 to about 7,000 cps when tested in accordance with ASTM D2196-15 and/or a functionality of from about 4 to about 5.

4. A rigid polyurethane foam as set forth in claim 1 wherein said second polyether polyol and said third polyether polyol are present in said thixotropic composition in a weight ratio of from about 1:1 to about 1:7.

5. A rigid polyurethane foam as set forth in claim 1 wherein said hydrofluoroolefin is selected from trans-1-chloro-3,3,3-trifluoropropene, 2,3,3,3-tetrafluoropropene, 1,3,3,3-tetrafluoropropene, and combinations thereof, and wherein said thixotropic composition further comprises water.

6. A rigid polyurethane foam as set forth in claim 1 wherein said first polyether polyol has a viscosity at 25° C. of from about 15,000 to about 25,000 cps when tested in accordance with ASTM D2196-15 and/or a functionality of about 4.

7. A rigid polyurethane foam as set forth in claim 1 wherein said thixotropic composition further comprises a polyester polyol which is different than said first, second, and third polyether polyols, and wherein said polyester polyol has a viscosity at 25° C. of from greater than about 8,000 to about 16,000 cps when tested in accordance with ASTM D2196-15 and/or a functionality of from about 2 to about 4.

8. A rigid polyurethane foam as set forth in claim 7 wherein said thixotropic composition further comprises a Mannich polyol which is different than said polyester polyol and said first, second, and third polyether polyols, and wherein said Mannich polyol has a viscosity at 25° C. of from greater than about 2,000 to about 8,000 cps when tested in accordance with ASTM D2196-15 and/or a functionality of from about 3 to about 5.

9. A rigid polyurethane foam as set forth in claim 1 wherein:
 a polyester polyol is present in said thixotropic composition in an amount of from about 10 to about 30 parts by weight, based on 100 parts by weight of said thixotropic composition; and/or,
 a Mannich polyol is present in said thixotropic composition in an amount of from about 5 to about 15 parts by weight, based on 100 parts by weight of said thixotropic composition.

10. A rigid polyurethane foam as set forth in claim 1 wherein said thixotropic composition has a viscosity of from about 300 to about 1,000 cps when tested in accordance with ASTM D2196-15.

11. A rigid polyurethane foam as set forth in claim 1 wherein said isocyanate comprises polymeric diphenylmethane diisocyanate and has a NCO content of from about 30.5 to about 32 weight percent, a nominal functionality of from about 2.6 to about 3.1, and/or a viscosity at 25° C. of from about 150 to about 750 cps when tested in accordance with ASTM D2196-15.

12. A rigid polyurethane foam as set forth in claim 1 having a density of from about 24 to about 80 kg/m$^3$ (about 1.5 to about 5 pcf) when tested in accordance with ASTM D1622-14 and/or a closed cell content of greater than about 85% when tested in accordance with ASTM D2856-94.

13. A rigid polyurethane foam as set forth in claim 1 having a k-factor of less than about 0.130 BTU.in/ft$^2$.hr.° F. when tested in accordance with ASTM C518-04.

14. A method of forming a composite article comprising a substrate and a rigid polyurethane foam, said method including the steps of:
 (A) providing a thixotropic composition which is isocyanate reactive, the thixiotropic composition comprising;
  (i) a first polyether polyol which is aromatic amine initiated and has ethylene oxide and propylene oxide end capping;
  (ii) a second polyether polyol having a viscosity at 25° C. of from about 500 to about 15,000 cps when tested in accordance with ASTM D2196-15;
  (iii) a third polyether polyol having a viscosity at 25° C. of from greater than about 18,000 to about 60,000 cps when tested in accordance with ASTM D2196-15 and a functionality of from about 5 to about 7; and
  (iv) a hydrofluoroolefin;
 wherein the first, second, and third polyether polyols are different and said thixotropic composition has a viscosity of from about 300 to about 5,000 cps when tested in accordance with ASTM D2196-15;
 said first polyether polyol is present in said thixotropic composition in an amount of from about 30 to about 60 parts by weight, based on 100 parts by weight of said thixotropic composition;
 said second polyether polyol is present in said thixotropic composition in an amount of from about 1 to about 10 parts by weight, based on 100 parts by weight of said thixotropic composition; and
 said third polyether polyol is present in said thixotropic composition in an amount of from about 5 to about 30 parts by weight, based on 100 parts by weight of said thixotropic composition;
 (B) providing an isocyanate;
 (C) combining the thixotropic composition and the isocyanate to form a reaction mixture; and
 (D) applying the reaction mixture to the substrate.

15. A polyurethane system for use in forming a composite article which comprises a substrate and a rigid polyurethane foam, said polyurethane system comprising:
 (A) a thixotropic composition which is isocyanate reactive, the thixiotropic composition comprising;
  (i) a first polyether polyol which is an aromatic amine initiated polyether polyol with ethylene oxide and propylene oxide end capping;
  (ii) a second polyether polyol having a viscosity at 25° C. of from about 500 to about 15,000 cps when tested in accordance with ASTM D2196-15;
  (iii) a third polyether polyol having a viscosity at 25° C. of from greater than about 18,000 to about 60,000 cps when tested in accordance with ASTM D2196-15 and a functionality of from about 5 to about 7;
  (iv) a hydrofluoroolefin; and
  (v) water;
 wherein said first, second, and third polyether polyols are different and said thixotropic composition has a viscosity of from about 300 to about 5,000 cps when tested in accordance with ASTM D2196-15;
 said first polyether polyol is present in said thixotropic composition in an amount of from about 30 to about 60 parts by weight, based on 100 parts by weight of said thixotropic composition;
 said second polyether polyol is present in said thixotropic composition in an amount of from about 1 to about 10 parts by weight, based on 100 parts by weight of said thixotropic composition; and
 said third polyether polyol is present in said thixotropic composition in an amount of from about 5 to about 30 parts by weight, based on 100 parts by weight of said thixotropic composition; and
(B) an isocyanate.

\* \* \* \* \*